July 25, 1967 B. L. STRATTON 3,333,063
SIGNAL DEMODULATING AND COMBINING CIRCUIT
FOR WIDEBAND REPRODUCING SYSTEMS
Filed Oct. 1, 1962 4 Sheets-Sheet 1

BOYD L. STRATTON
INVENTOR.
BY Nathan N. Kallman
ATTORNEY

BOYD L. STRATTON
INVENTOR.

BY Nathan N. Kallman

ATTORNEY

BOYD L. STRATTON
INVENTOR.

BY Nathan N. Kallman

ATTORNEY

BOYD L. STRATTON
INVENTOR.

BY Nathan N. Kallman

ATTORNEY 3,333,063
Patented July 25, 1967

3,333,063

SIGNAL DEMODULATING AND COMBINING CIRCUIT FOR WIDEBAND REPRODUCING SYSTEMS

Boyd L. Stratton, Redwood City, Calif., assignor to Ampex Corporation, Redwood City, Calif., a corporation of California Filed Oct. 1, 1962, Ser. No. 227,214
5 Claims. (Cl. 179—100.2)

This invention pertains to signal reproducing systems and more specifically to systems for reproducing wideband information recorded on magnetic tape.

Various systems are known for recording large amounts of information with high density on magnetic tapes. These systems are extremely useful in recording wideband television signals or instrumentation data from many sources. One very successful system now in use utilizes a relatively slowly traveling magnetic tape, the movement of which may be accurately controlled. Signals are recorded by a plurality of heads disposed at the outer periphery of a drum rotating at a very high speed, so that the heads cross the tape to record closely spaced, transverse information tracks. In a preferred example of these high speed transverse recording systems, a cylindrical rotating drum has four magnetic heads positioned at cardinal points about its outer circumference. A switching arrangement is coupled to the heads so that the signal information derived from the individual tracks during reproduction is recombined into a single continuous sequence.

Wideband systems have to operate accurately over a very broad frequency range extending from substantially DC to several megacycles per second or more. It is often found advantageous to convert the signals before recording into frequency modulated (FM) representations, because greater linearity and superior amplitude stability can be obtained.

The serial recombination of the signals during reproduction from the transverse tracks tends to introduce switching transients as well as amplitude and phase equalization problems between the channels. With FM recordings, substantial switching transients result from the phase discontinuities which appear at the switching intervals.

Various solutions have been offered for eliminating the transients generated by switching between the individual signals in transverse track reproducing systems. One system utilizes slow switching with an overlap period between signals so that one signal becomes gradually less while the other becomes gradually greater. This has the effect of eliminating a great portion of the discontinuities caused by the switching but may continue the switching over a substantial interval.

It is therefore a general object of this invention to provide improved systems for reproducing signals recorded at a high rate on magnetic tape.

Another object of this invention is to substantially eliminate transient effects which occur during switching and which are introduced into the output signals reproduced from transverse tracks recorded on magnetic tape.

An additional object of this invention is to minimize the transients arising from phase discontinuities caused by switching during the reproduction of FM signals from magnetic tape.

Briefly, the objects of this invention are accomplished by a system that demodulates reproduced FM signals derived from individual transverse tracks prior to combining the signals into a single output signal. By demodulating the FM signals prior to switching, phase discontinuities do not give rise to high switching transients because they are not introduced into the signal until after the demodulation process. The system is advantageously provided with means for adjusting the bias levels and gain of the separately demodulated signals to eliminate such differences before combining the individual signals into a single continuous output signal.

The invention may be better understood by reference to the following detailed description and the accompanying drawings, in which.

Figure 1:
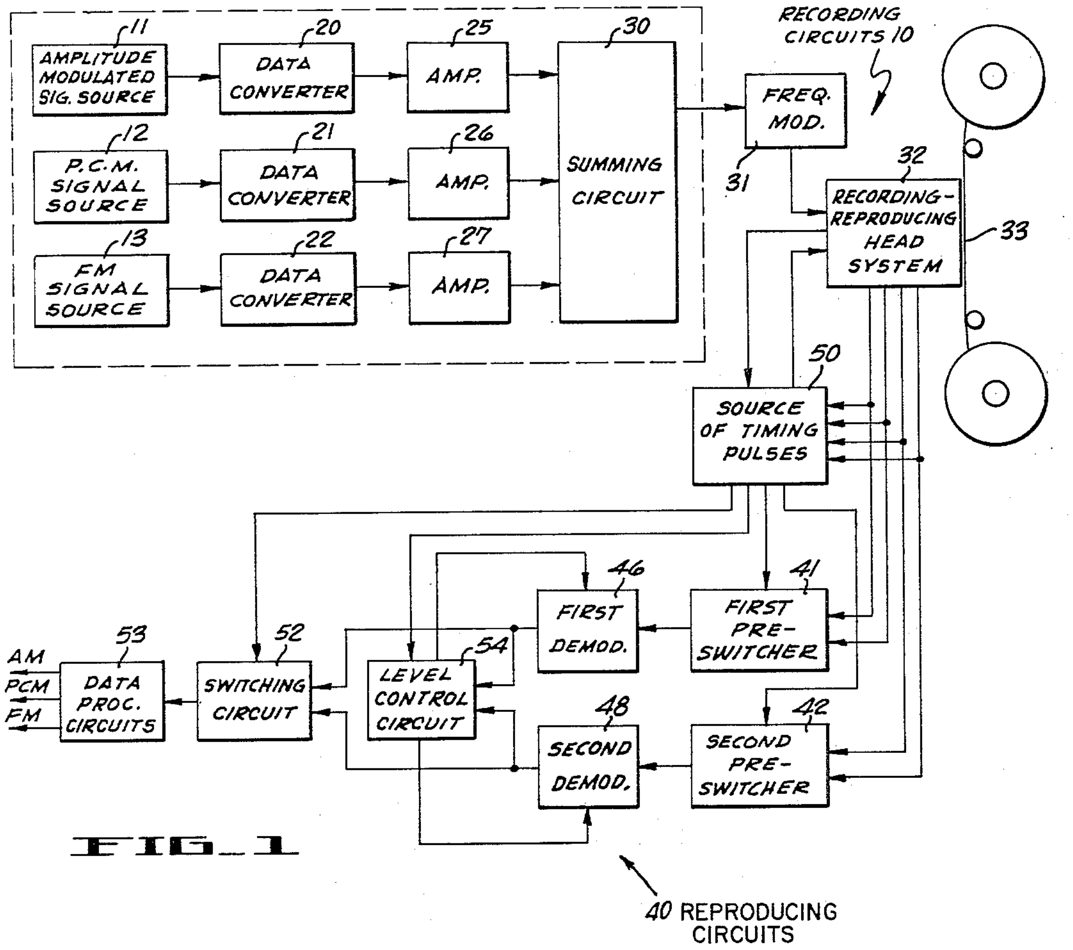
FIGURE 1 is a block diagram of a recording-reproducing system in accordance with the invention.

In FIGURE 1, the block diagram presents in generalized form a representative recording-reproducing system illustrative of the invention. For clarity and simplicity, recording circuits 10 are shown as receiving information from input circuits such as might be utilized in instrumentation applications. For example, amplitude modulated signals are provided from one source 11, pulse code modulated signals from another source 12 and frequency modulated signals are provided from a source 13. In the input circuits these signals are translated to specific frequency bands by data converters 20, 21, 22 respectively and then applied through amplifiers 25, 26, 27 respectively to a summing circuit 30. This is merely one example of a high data rate system that serves to provide input information to recording and reproducing systems in accordance with the invention.

The output signals from the summing circuit 30 are applied to a frequency modulator 31 that forms a part of the recording circuits 10. The frequency modulated signals are directed to a recording-reproducing head system 32, wherein the signals are recorded on individual transverse tracks across a relatively slow moving magnetic tape 33. Details of the tape transport and associated circuitry are well known and need not be described here.

During reproduction, the recorded information is derived from the magnetic tape 33 by the head system 32 in four separate channels and channeled to the reproducing circuits 40 through separate first and second preswitchers 41, 42, which serve to perform both switching and amplifying functions. As will be explained in more detail later, oppositely-positioned recording and reproducing heads on a rotating head drum reproduce signals from the tape at successive non-coincident time intervals. Signals from adjacent heads overlap in time, but signals from opposite heads on the head drum do not. Thus the signals applied to the first pre-switcher 41 are transferred from heads positioned at 180° relative to each other on the head drum, and the signals applied to the second pre-switcher 42 are derived from the remaining opposed pair of reproducing heads. The pre-switchers 41, 42 may each consist of a pair of conventional gated amplifiers which are alternately activated by timing signals as described below and provide output signals to a common output terminal.

The signals from the different pre-switchers 41, 42 are transferred to separate first and second demodulating circuits 46, 48 respectively. The individual demodulators 46 and 48 each include appropriate circuitry for deriving part of the original coded or modulated information from the applied frequency modulated signals. The signals are coupled from the demodulators 46 and 48 to a switching circuit 52 where a single serial signal is obtained. This signal may then be passed to output data processing circuits 53 at which the separate frequency bands are separated to provide the original AM, PCM and FM signals in the present example.

A level control circuit 54 samples the signal levels at the demodulators 46 and 48 and adjusts the instantaneous bias levels so that they are identical when switching occurs. The pre-switchers 41, 42, the level control circuit 54 and the switching circuit 52 are controlled by a source of timing pulses 50 responsive to head drum position. The source of timing pulses 50 generates control signals which cause switching between reproduced signals in the different channels at the appropriate points in time. The source of timing pulses 50 may be further controlled by timing pulses recorded on the tape 33, by synchronizing signals contained within the recorded signal information, by an external timer, or by a combination of these. Such additional control capabilities afford greatly enhanced systems capability for handling data from different sources.

Because the information signals appearing at the switching circuit 52 have identical bias levels at the switching times, as controlled by the level control circuit 54, the switching circuit 52 voltage output signal is smooth and continuous. Because the signals appearing at the switching circuit 52 are not carrier frequency modulated (except as the input signal may be FM), phase discontinuities do not appear at the switching times to give rise to large amplitude transients after demodulation.

Figure 2:
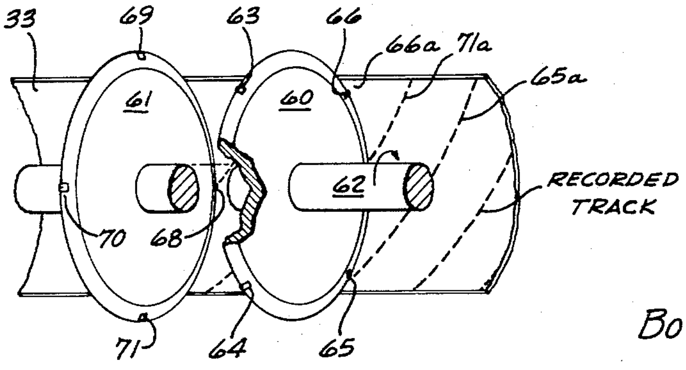
FIGURE 2 is an idealized perspective view of a multiple drum arrangement for a transverse recording and reproducing system showing its relationship to a magnetic tape.

In FIGURE 2 there is shown an exemplary idealized mechanism including two multiple head drums and associated heads for recording on and reproducing information from magnetic tape. The arrangement of FIGURE 1 comprises a single multiple head drum system, but the invention is applicable to all such systems. The mechanism of FIGURE 2 includes first and second coaxial but axially displaced rotating drums 60 and 61, the axial displacement being greatly enlarged for clarity. The first drum 60 has four magnetic heads 63–66 mounted around its outer circumference at 90° intervals while the second drum 61 has four heads 68–71 similarly disposed. The drums 60 and 61 are rotated in the direction shown by the arrows on a common shaft 62. The relatively wide magnetic tape 33 is advanced by conventional capstan or other means past the heads 60 and 61 at an appropriate, relatively slow rate, for example, 12 inches per second, to allow for precise control of the travel of the tape 33 and attendant recording accuracy. The tape 33 is cupped about part of the circumferences of the drums 60 and 61. In this position the width of the tape 33 is less than sufficient to cover the distance separating those heads which are displaced by 180° but is more than sufficient to cover the distance separating adjacent heads. The use of two head drums 60 and 61 is particularly suited for instrumentation applications, because more channels can be recorded and reproduced. The dual-head arrangement is shown for ease of visualization of the dual recording-reproducing system described in conjunction with FIGURE 3.

In operation, the drums 60 and 61 rotate at an identical speed. As the tape 33 is advanced past the drums 60 and 61, each of the magnetic recording heads comes in contact with and describes a track across the tape 33. The entire width of the tape is not usually used for this purpose inasmuch as longitudinal tracks along the edges are used for audio signals and timing data. In FIGURE 2 the angle of these tracks relative to the longitudinal axis of the tape has been appreciably distorted so that the disposition of the transverse tracks may be better shown. Actually, the tracks are much more nearly transverse to the tape and much closer together. As the drum 60 rotates, a head 65 comes in contact with the adjacent surface of the tape 33 and describes a transverse track *65a* across the tape, recording thereon the signal patterns with which the head 65 is energized. In like fashion, a head 71 of the drum 61 contacts the tape 33 and records a track of information *71a* across the tape 33. Just before one head 65 leaves the tape 33, the next head 66 comes in contact therewith and begins to describe a transverse track *66a*. The adjacent heads 65 and 66 are concurrently in contact with the tape 33 during a portion of their traverse. This concurrent recording at the edges of the tape provides an overlap interval so that no information loss occurs. Tape stretch, tape skew and other mechanical factors cause slight but significant differences between the signals as they are reproduced from separate tracks. These differences appear as phase discontinuities with frequency modulated signals and are most serious with such systems because they introduce wide signal excursions in the demodulated signal.

The opposing heads on the drums 60 or 61 are never in contact with the tape 33 at the same time. Therefore the information derived from individual tracks which are separated by 180° may be processed by one of the pre-switchers 41, 42, as shown above in FIGURE 1. Switching between opposing heads is effected during intervals in which signals are not being reproduced by either head of the pair. A relatively long interval is available for such switching, and it serves to eliminate extraneous noise. It is to be understood that conventional means, not shown, are utilized for furnishing signals to and deriving signals from the heads 63–66 and 68–71.

Figure 3:
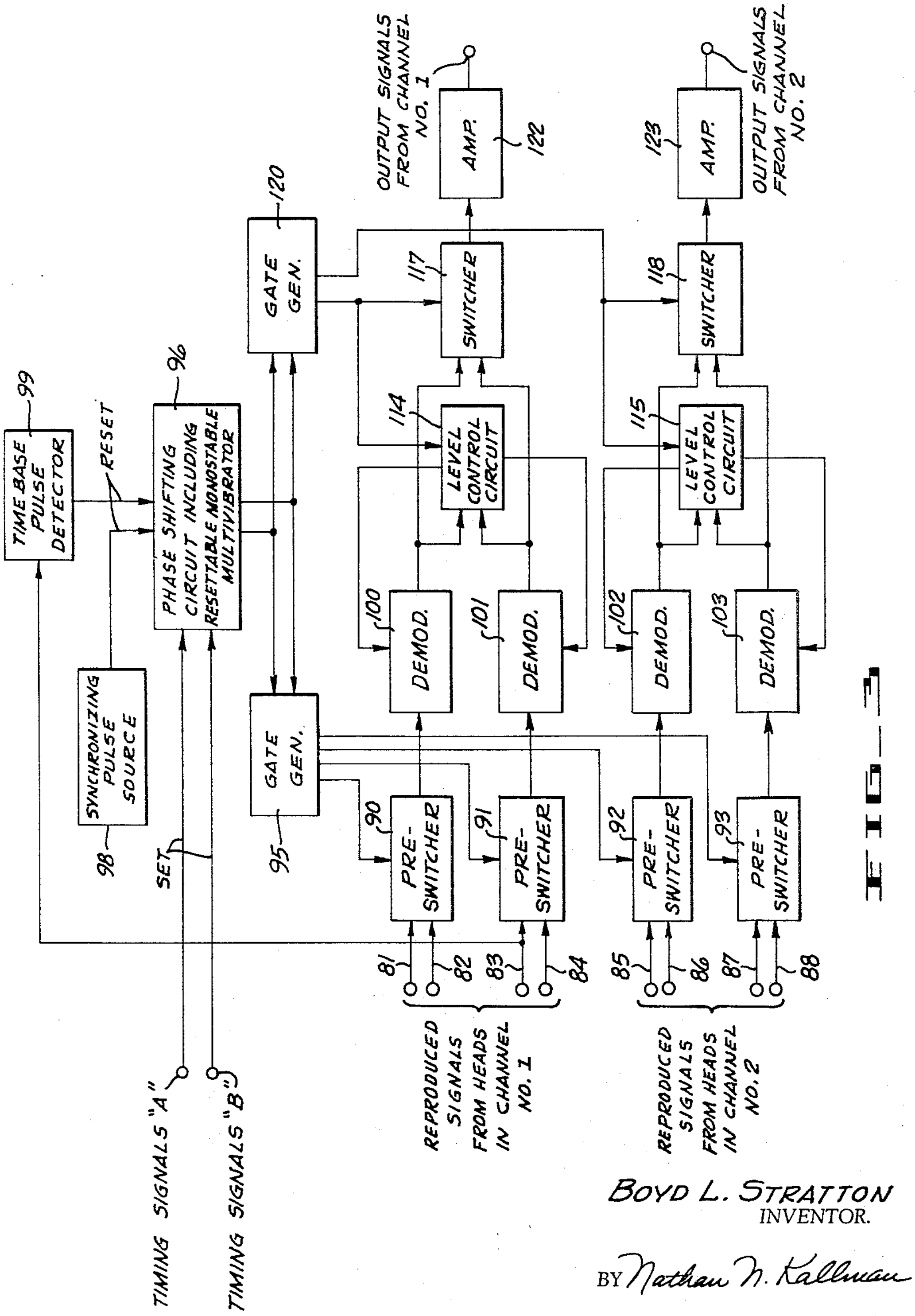
FIGURE 3 is a block diagram showing further details of a signal reproducing system in accordance with the invention.

FIGURE 3 illustrates in block digram form an exemplary wideband signal reproducing system in accordance with the invention. The circuit shown in FIGURE 3 is adapted to receive input signals from two rotating drums, such as those shown in FIGURE 2, upon each of which is mounted a total of four magnetic heads. The signals from the individual magnetic heads are transferred to two different channels through separate sets of conductors 81–84 and 85–88 to a plurality of pre-switchers 90–93. Preamplifiers and like circuitry are not shown in detail but will be understood to be used as needed.

It should be noted that two conductors are connected to each of the pre-switchers 90–93; for example the conductors 81 and 82 each couple signals to the pre-switcher 90. As explained with regard to FIGURE 2, this initial pairing of the input signals from oppositely disposed magnetic heads materially reduces the number of components without introducing undesired transients. Signal inputs are switched off during no-signal intervals under control of a gate generator circuit 95, which responds to timing pulses A and B by providing suitable control signals at its output terminals. The gate generator 95 may consist, for example, of a group of bistable multivibrators which are turned on and off in selective fashion allowing the pre-switchers to accept the output signal from each head during the time that head is in contact with the tape.

Figure 5:
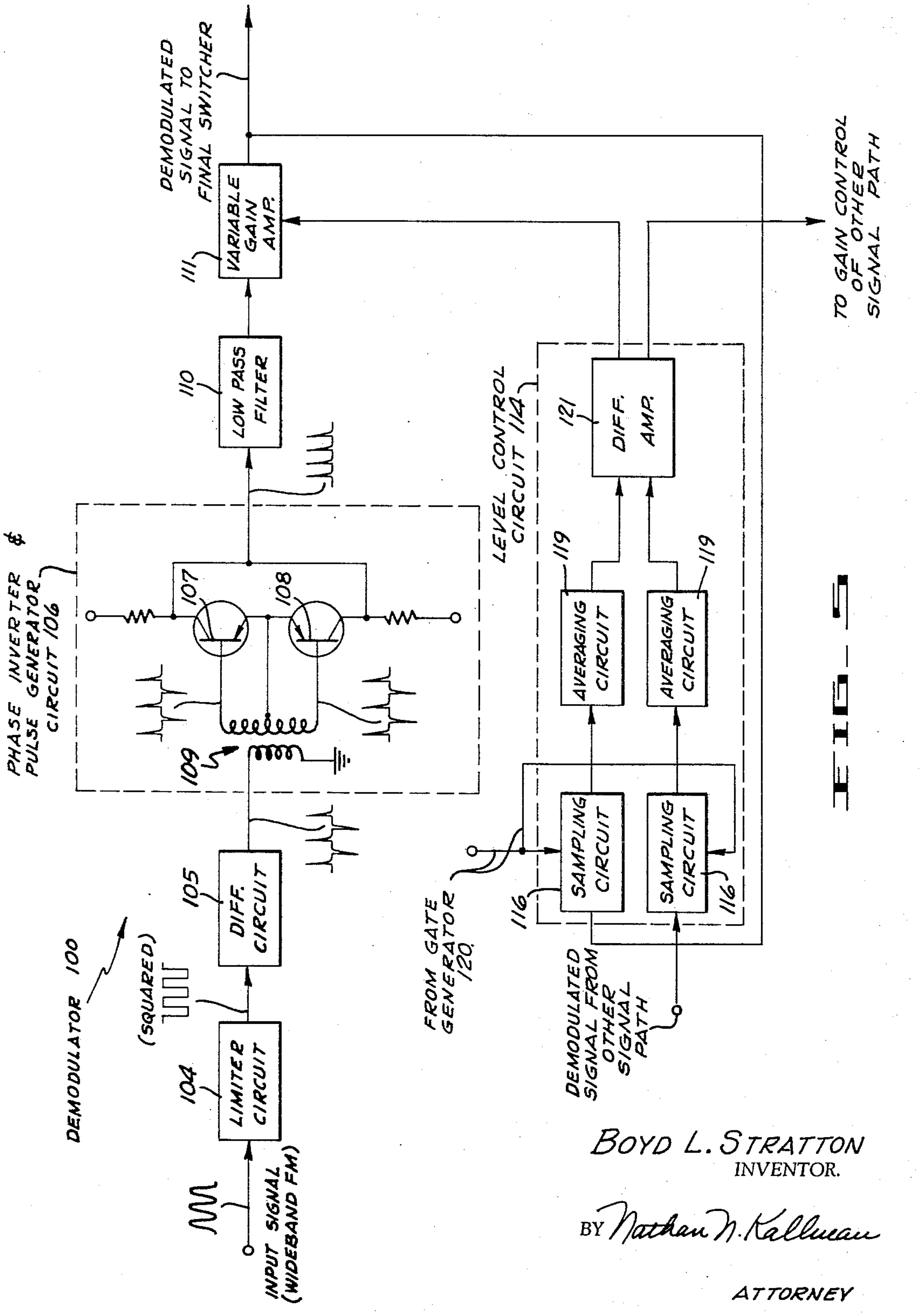
FIGURE 5 is a block diagram of demodulator and signal level control circuits useful in systems in accordance with the invention.

The signals from each paired set of oppositely disposed reproducing heads consist essentially of frequency modulated components. These components are separately demodulated to regenerate the original signal information by a discriminator, pulse-counter, or other type of demodulator 100–103. In the pulse counter type of demodulator, for example, zero-crossings in the FM wave are used to generate pulses which indicate by their time-density the information content of the wave. A particularly useful form of demodulator circuit is shown in detail in FIGURE 5. In FIGURE 5, input FM signals are first converted to an essentially rectangular waveform by a squaring limiter circuit 104. The sharp rising and falling edges of this wave then generate voltage spikes of positive or negative polarity at a differentiator circuit 105. These voltage spikes trigger a phase inverter and pulse generator circuit 106 which operates on the transistor stored charge principle at an adequately high speed for wideband systems. The extremely high pulse rates which are required are obtained by driving each of a pair of PNP type transistors 107, 108 oppositely in polarity from the different terminals of the secondary of a transformer 109. The stored charge effect permits substantially constant pulses to be generated, despite the repetition rate of the input pulses. A train of standard width monopolar pulses thus results at the common output terminal of the transistors 107, 108, each being triggered in coincidence with a different axis-crossing of the FM signal. Because of the frequency spectrum that must be covered by a wideband recording system, it is preferred to use a very fast-acting type of pulse generator that provides a short output pulse, such as a tunnel diode circuit, or a transistor stored charge circuit.

The time average of the standard pulses from the pulse generator circuit 106 represents the original input signal. A low pass filter circuit 110, which may be an integrator circuit extracts the original signal components to provide the output signal from each demodulator 100. The demodulator circuit may include a variable gain amplifier 111 controllable by means described below, so as to insure gain equalization of the different signals in a channel. Balancing between the parts of the channel may also be accomplished by adjusting the "ON" times of the pulse generators 106.

An AGC arrangement is preferred, however, because it permits continual compensation for differential head wear and other effects. To this end, a gain or level control circuit 114, 115 (referring again to FIGURE 3) may be coupled to sample the demodulated signals in each channel and to provide a feedback control signal for adjusting the amplitudes of the signals in each half of each channel. As seen in FIGURE 5, the level control circuit 114 may include sampling circuit 116 which receive the respective demodulated signals in each path. At the initiation of a timing pulse from the gate generator 120 the sampling circuits pass brief pulses representative of the instantaneous amplitudes of the demodulated signals at the sampling time. These sample pulses are averaged in circuits 119 over a number of pulses, inasmuch as error accumulates slowly. The two averaged signals are then applied to a difference amplifier 121 or other comparator and AGC signals are generated for controlling the variable gain amplifiers 111. During the overlap intervals and switching times, therefore, the like recorded signals are reproduced with equal amplitudes in each half of a channel.

Final combination of the signals in each channel is carried out at switchers 117, 118 under control of a second gate generator 120, which is in turn operated at specific times under control of the phase shifting circuit 96. Output signals for each channel are then derived from separate output amplifiers 122, 123.

The timing circuits which are coupled to the gate generator circuit 95 may operate to insure switching at desired times under a variety of conditions. With television signals, for example, a fixed number of television lines may be recorded per transverse track and switching thus takes place in the blanking intervals. In the present system the gate generators are coupled to respond to timing signals "A" and "B" from a head drum pickoff to develop signals which denote specific rotational positions of the head drum. These rotational positions include those in which adjacent heads are located in the overlap areas and also those in which opposite heads on the drum are not reproducing signals. Within the overlap interval, which may be 150 microseconds by way of example, it is very often desired to effect switching at specific times that are related to other events. This further control is also affected by the gate generator circuit 95, in combination with a phase shifting circuit 96. With instrumentation data, for example, it is sometimes preferred to control timing by use of a stable external frequency reference, and thus to switch in synchronism with pulses from the reference. Provision is made for control of switching in this manner in the present system. The system also includes means for controlling switching by using a particular data format on the tape, specifically time base marker pulses recorded at selected intervals (here in the conductor 83 for the second track of the first channel) throughout the data. In addition, particularly with recordings made in a predetection mode, switching may be controlled in synchronism with the end of word groups on the tape, or by an external timer.

The present system readily permits any of these signals to be used to control the time of switching. The head drum timing signals "A" and "B" are applied to the phase shifting circuit 96 that adjusts the time relation of the switching event in accordance with operative conditions. The phase shifting circuit 96 may include a resettable monostable multivibrator that has a nominal "ON" period (say 150 microseconds) following setting by the timing signals. In the absence of the reset pulse, the circuit 96 provides an output pulse from the trailing edge of the multivibrator pulse, at a selected time following initiation of the pulse which set the multivibrator. A differentiator (not shown) may be used for the purpose of generating trailing edge pulses of a selected polarity. Reset pulses, which actively terminate the multivibrator pulses, may be provided either from a time-stable synchronizing pulse source 98 or by a time base pulse detector circuit 99 from time data recorded on the tape. Time base marker pulses may be identified by particular amplitude (or frequency) excursions from the instrumentation data itself by the detector 99.

Figure 4:
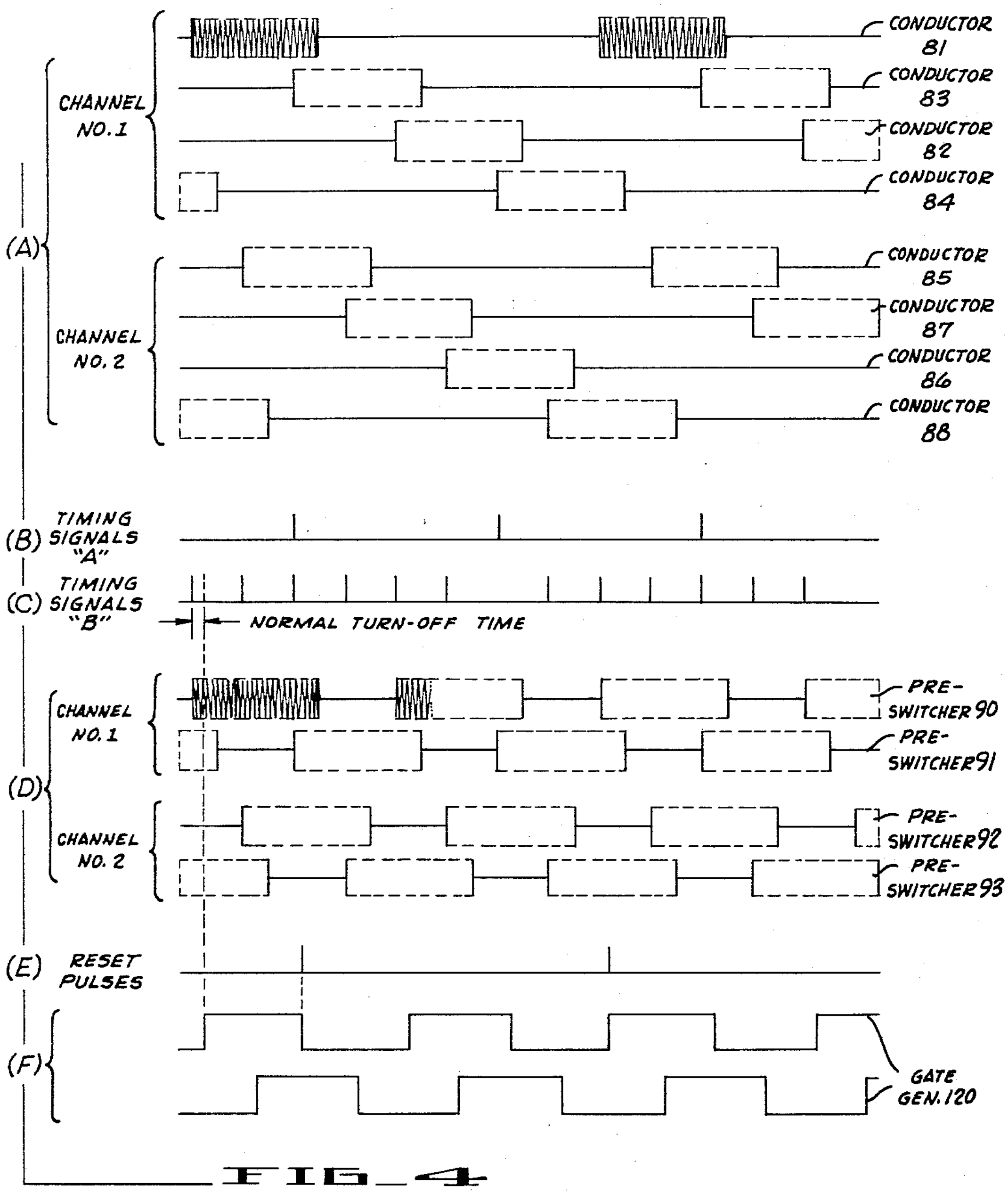
FIGURE 4 is a timing diagram showing various signal relationships and waveforms arising in the operation of the system of FIGURE 3.

Operation of the system of FIGURE 3 as a whole may best be understood by reference to the waveforms of FIGURE 4. Frequency modulated input signals are derived at separate conductors 81–88 from the four separate heads in each channel (waveform (A)). The heads on the two head drums are displaced by 45° (see FIGURE 2). Note that the pairs of conductors (81, 82, and 83, 84 in channel No. 1) are coupled to oppositely disposed, not adjacent, heads on the head drum. The non-overlapping reproduced signal trains are coupled together at the gating pre-switchers 90–93 to produce the separate signals of waveform (D) which overlap in time.

The timing signals, "A" and "B," are provided to define the overlap intervals for the two head drums, as shown in waveforms (D) and (C) respectively. Two "A" signals and seven "B" signals are provided during each full head drum cycle, with the "A" signals marking 180° points and the "B" signals marking 45° points. One "B" signal at a 180° point is not used, so that the head drum cycle is non-ambiguously divided into 45° intervals which identify the start of overlap between each pair of adjacent heads for both drums.

The trailing edges of the pulses from the monostable multivibrator in the phase shift circuit 96 also occur during the overlap intervals. The monostable multivibrator is set at the start of each overlap interval and its normal turn-off time is selected so that it resets itself during the overlap interval. The trailing edge of the pulse from the monostable multivibrator is used to control the gate generators 95, 120. For precise adjustment of the switching times relative to the data within the overlap intervals and for greater system versatility, however, the pulses from the monostable multivibrator may also be terminated at any time during its natural period by reset pulses (waveform (E)). These pulses may be derived from the time base pulse detector 99, from the synchronizing pulse source 98, or from the timing pulses in the data. The actuating pulses from the phase shifting circuit 96 for the gate generators therefore correspond in time to the normal trailing edge of a multivibrator pulse, or to an externally applied pulse, whichever occurs first. It will be appreciated that the waveform and time relationships shown are broadly generalized, and not to scale.

The gate generator 120 therefore generates two rectangular waves for controlling final switching. In the example shown, (F), the transition points in the waves normally occur at the normal turn-off times of the multivibrator in the phase shifting circuit 96. At two points, however, the reset pulses (waveform (E)) control. In any event, the data signals are properly recombined at the final switchers 117, 118 for both heads into single serial trains.

A number of advantages are derived from the arrangement of the means for demodulating the reproduced signals. The circuits involved are simple but reliable, and provide the discrimination against noise that is characteristic of FM systems. Reproduced FM signals are applied to the demodulators 100–103, with major irregularities removed by the signal limiters and standard width pulse generators.

Because switching during overlap intervals operates only upon demodulated signals, and because these voltages are balanced at the switching times by the AGC feature, no large transients are introduced by the switching, even though it may be rapid. In any event, switching transients are greatly reduced in amplitude and duration.

The system is extremely versatile in other respects than permitting several different controls of the switching time. If it is not desired to demodulate, as in playback in a predetection mode, the demodulator can be replaced by a limiter. Switching is then timed to coincide with the end of predetermined word groupings in the data. Tapes recorded with other systems may be reproduced compatibly by systems in accordance with the invention, with its attendant advantageous characteristics.

While there have been described above and illustrated in the drawings various forms of reproducing systems in accordance with the invention, it will be appreciated that the invention is not limited thereto. Accordingly, the invention should be considered to include all modifications, variations and alternative forms falling within the scope of the appended claims.

What is claimed is:

1. A circuit for combining and demodulating frequency modulated signals derived from patterns recorded on successive tracks on magnetic tapes comprising:
   - multihead means for reproducing the recorded signals;
   - first and second gating means each coupled to more than one head of the multihead means and each deriving a single serially appearing train of signals;
   - a pair of demodulators, each coupled to receive the train of signals from a different one of the first and second gating means, and each coupled to provide a demodulated signal level representative of the frequency modulated information;
   - equalizing means responsive and coupled to control both of the demodulators to vary the gains thereof to equalize the demodulated signal levels; and
   - means for combining the equalized demodulated signals at an output terminal.

2. A circuit for deriving signals recorded as frequency modulated patterns in tranverse tracks on a magnetic tape comprising:
   - means for successively reproducing the frequency modulated signals recorded on each of the transverse tracks of the tape;
   - pre-switching means responsive to the reproduced signals for combining non-overlapping parts thereof to provide the reproduced signals in at least two separate paths;

- demodulating circuit means coupled to receive the signals from the separate paths for deriving analog voltage representations thereof;
   - gain control means responsive to the levels of both the analog voltages for controlling both the demodulating circuit means to equalize the outputs thereof; and
   - timed switching means for combining all of the analog voltage representations into a single serial demodulated output representation.

3. A circuit for deriving a continuous signal from recorded frequency modulated signal patterns disposed on separate transverse tracks on a magnetic tape, the recorded patterns having time overlapping end portions, comprising:
   - means for individually reproducing the signals recorded on the transverse tracks, the reproduced signals derived from the overlapping end portions being provided concurrently;
   - means providing timing signals during reproduction of the overlapping end portions;
   - means providing time base signals;
   - phase shifting circuit means responsive to the timing signals and the time base signals for providing switching control pulses during the overlapping end portions; and
   - switcher means coupled to receive the individually reproduced signals and the switching control pulses for sequentially utilizing segments of each of the individually reproduced signals.

4. A system for controlling the switching together of frequency modulated signals reproduced from separate tracks in a transverse track magnetic recording system, like signals being reproduced from adjacent tracks concurrently at time-overlapping end portions bearing like recordings, the system comprising:
   - means synchronizing with the magnetic recording system for providing timing signals during the time-overlapping end portions;
   - means providing time base pulses identifying desired switching points relative to the reproduced signals;
   - controllable pulse generator means coupled to receive the timing signals and the time base pulses, the controllable pulse generator means including a resettable monostable multivibrator arranged to be turned on by the timing pulses and to be reset after a selected interval within the time-overlapping end portions or by a time base pulse, whichever occurs first; and
   - means for providing a switching control pulse at the resetting of the monostable multivibrator, the system also including pre-switcher means coupled to receive the reproduced signals separately and the switching control pulses for combining non-concurring reproduced signals in two signal paths;
   - demodulator means in each of the signal paths, said demodulator means providing an amplitude varying representation of the frequency modulated signals;
   - gain control means responsive to the amplitude varying representations and coupled to control the demodulator means; and
   - switching means coupled to both the demodulator means and to receive the switching control pulses for switching together the signals from the two paths during the concurrently reproduced portions thereof.

5. A signal combining system for use in combination with a record-reproduce head drum having multiple heads and reproducing signals from a transverse track magnetic tape system comprising:
   - means for deriving separate frequency modulated signal sequences from the individual tracks, alternate ones of the sequences being non-concurrent with each other and adjacent ones of the sequences having time concurrent paths;

means, including gating means receiving the signal sequences separately, for combining non-concurrent sequences;

means responsive to each of the combined sequences for providing analog signals representative of the frequency modulated signals appearing therein;

means responsive to both the analog signals for adjusting both the levels thereof to be substantially equal during intervals of concurrence; and means for selectively combining the adjusted analog representations to form a single continuous serial analog signal.

References Cited

UNITED STATES PATENTS

| | | | |
|---|---|---|---|
| 2,916,546 | 12/1959 | Ginsburg et al. | 179—100.2 |
| 3,031,525 | 4/1962 | Oniki | 178—6.6 |
| 3,045,114 | 7/1962 | Mindes | 325—433 |
| 3,123,999 | 3/1964 | Judd | 324—103 |
| 3,188,615 | 6/1965 | Wilcox | 179—100.2 |

FOREIGN PATENTS

| | | |
|---|---|---|
| 904,036 | 8/1962 | Great Britain. |

BERNARD KONICK, *Primary Examiner.*

V. P. CANNEY, *Assistant Examiner.*